(12) United States Patent
Wasiq et al.

(10) Patent No.: US 9,781,081 B1
(45) Date of Patent: Oct. 3, 2017

(54) LEVERAGING TRANSPORT-LAYER CRYPTOGRAPHIC MATERIAL

(71) Applicant: Amazon Technologies, Inc., Seattle, WA (US)

(72) Inventors: Muhammad Wasiq, Vancouver (CA); Nima Sharifi Mehr, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 91 days.

(21) Appl. No.: 14/874,248

(22) Filed: Oct. 2, 2015

(51) Int. Cl.
*H04L 29/06* (2006.01)
*H04L 9/32* (2006.01)
*H04K 1/00* (2006.01)
*H04L 9/00* (2006.01)

(52) U.S. Cl.
CPC .......... *H04L 63/0428* (2013.01); *H04L 63/06* (2013.01); *H04L 63/166* (2013.01); *H04L 63/168* (2013.01)

(58) Field of Classification Search
CPC ... H04L 63/0428; H04L 63/06; H04L 63/166; H04L 63/168
USPC ........ 713/152, 151, 168, 171; 380/255, 262, 380/44
See application file for complete search history.

(56) References Cited

U.S. PATENT DOCUMENTS

| | | | | |
|---|---|---|---|---|
| 9,270,449 | B1* | 2/2016 | Tribble | ............... H04L 63/0435 |
| 2004/0243349 | A1* | 12/2004 | Greifeneder | .......... H04L 63/166 702/183 |
| 2006/0184798 | A1* | 8/2006 | Yaldwyn | ................. G06F 21/10 713/180 |
| 2007/0094723 | A1* | 4/2007 | Short | ..................... H04L 69/16 726/14 |
| 2009/0083539 | A1* | 3/2009 | Catherman | ............. G06F 21/57 713/156 |
| 2010/0208897 | A1* | 8/2010 | Goto | ..................... H04L 9/0816 380/279 |

(Continued)

OTHER PUBLICATIONS

Phelan, T., "Datagram Transport Layer Security (DTLS) over the Datagram Congestion Control Protocol (DCCP)," Request for Comments: 5238, Standards Track, May 2008, 11 pages.

(Continued)

*Primary Examiner* — Aravind Moorthy
(74) *Attorney, Agent, or Firm* — Davis Wright Tremaine LLP

(57) ABSTRACT

A client application cryptographically protects application data using an application-layer cryptographic key. The application-layer cryptographic key is derived from cryptographic material provided by a cryptographically protected network connection. The client exchanges the cryptographically protected application data with a service application via the cryptographically protected network connection. The client and service applications acquire matching application-layer cryptographic keys by leveraging shared secrets negotiated as part of establishing the cryptographically protected network connection. The shared secrets may include information that is negotiated as part of establishing a TLS session such as a pre-master secret, master secret, or session key. The application-layer cryptographic keys may be derived in part by applying a key derivation function, a one-way function or a cryptographic hash function to the shared secret information.

20 Claims, 11 Drawing Sheets

(56) References Cited

U.S. PATENT DOCUMENTS

| | | | | |
|---|---|---|---|---|
| 2011/0099377 | A1* | 4/2011 | Hoornaert | H04L 9/3234 713/172 |
| 2012/0174196 | A1* | 7/2012 | Bhogavilli | H04L 63/1458 726/5 |
| 2013/0117555 | A1* | 5/2013 | Yang | H04L 63/0428 713/151 |
| 2014/0283109 | A1* | 9/2014 | Quong | G06F 21/10 726/27 |
| 2016/0080332 | A1* | 3/2016 | Zombik | H04L 41/28 713/168 |
| 2016/0094456 | A1* | 3/2016 | Jain | H04L 41/0813 370/235 |

OTHER PUBLICATIONS

Dierks, T., and E. Rescorla, "The Transport Layer Security (TLS) Protocol Version 1.2," Request for Comments: 5246, Standards Track, Aug. 2008, 98 pages.

Salowey, J., et al., "AES Galois Counter Mode (GCM) Cipher Suites for TLS," Request for Comments: 5288, Standards Track, Aug. 2008, 9 pages.

Rescorla, E., "TLS Elliptic Curve Cipher Suites with SHA-256/384 and AES Galois Counter Mode (GCM)," Request for Comments: 5289, Informational, Aug. 2008, 7 pages.

Igoe, K., and J. Solinas, "AES Galois Counter Mode for the Secure Shell Transport Layer Protocol," Request for Comments: 5647, Informational, Aug. 2009, 10 pages.

Stebiula, D., and J. Green, "Elliptic Curve Algorithm Integration in the Secure Shell Transport Layer," Request for Comments: 5656, Standards Track, Dec. 2009, 19 pages.

Rescorla, E., et al., "Transport Layer Security (TLS) Renegotiation Indication Extension," Request for Comments: 5746, Standards Track, Feb. 2010, 16 pages.

McGrew, D., and E. Rescorla, "Datagram Transport Layer Security (DTLS) Extension to Establish Keys for the Secure Real-time Transport Protocol (SRTP)," Request for Comments: 5764, Standards Track, May 2010, 27 pages.

Brown, M., and R. Housley, "Transport Layer Security (TLS) Authorization Extensions," Request for Comments: 5878, Experimental, May 2010, 19 pages.

Kato, A., et al., "Camellia Cipher Suites for TLS," Request for Comments: 5932, Standards Track, Jun. 2010, 7 pages.

Eastlake, E., "Transport Layer Security (TLS) Extensions: Extension Definitions," Request for Comments: 6066, Standards Track, Jan. 2011, 25 pages.

Tuexen, M., et al., "Datagram Transport Layer Security (DTLS) for Stream Control Transmission Protocol (SCTP)," Request for Comments: 6083, Standards Track, Jan. 2011, 10 pages.

Mavrogiannopoulos, N., and D. Gillmor, "Using OpenPGP Keys for Transport Layer Security (TLS) Authentication," Request for Comments: 6091, Informational, Feb. 2011, 9 pages.

Turner, S., and T. Polk, "Prohibiting Secure Sockets Layer (SSL) Version 2.0," Request for Comments: 6176, Standards Track, Mar. 2011, 4 pages.

Igoe, K., and D. Stebila, "X.509v3 Certificates for Secure Shell Authentication," Request for Comments: 6187, Standards Track, Mar. 2011, 17 pages.

Kim, W., et al., "Addition of the ARIA Cipher Suites to Transport Layer Security (TLS)," Request for Comments: 6209, Informational, Apr. 2011, 10 pages.

Igoe, K., "Suite B Cryptographic Suites for Secure Shell (SSH)," Request for Comments: 6239, Informational, May 2011, 15 pages.

Rescorla, E., and N. Modadugu, "Datagram Transport Layer Security Version 1.2," Request for Comments: 6347, Standards Track, Jan. 2012, 33 pages.

Kanno, S., and M. Kanda, "Addition of the Camellia Cipher Suites to Transport Layer Security (TLS)," Request for Comments: 6367, Informational, Sep. 2011, 9 pages.

Salter, M., and R. Housley, "Suite B Profile for Transport Layer Security (TLS)," Request for Comments: 6460, Informational, Jan. 2012, 15 pages.

Sury, O., "Use of the SHA-256 Algorithm With RSA, Digital Signature Algorithm (DSA), and Elliptic Curve DSA (ECDSA) in SSHFP Resource Records," Request for Comments: 6594, Standards Track, Apr. 2012, 9 pages.

McGrew, D., and D. Bailey, "AES-CCM Cipher Suites for Transport Layer Security (TLS)," Request for Comments: 6655, Standards Track, Jul. 2012, 8 pages.

Bider, D., and M. Baushke, "SHA-2 Data Integrity Verification for the Secure Shell (SSH) Transport Layer Protocol," Request for Comments: 6668, Standards Track, Jul. 2012, 6 pages.

Merkle, J., and M. Lochter, "Elliptic Curve Cryptography (ECC) Brainpool Curves for Transport Layer Security (TLS)," Request for Comments: 7027, Informational, Oct. 2013, 11 pages.

Gutmann, P., "Encrypt-then-MAC for Transport Layer Security (TLS) and Datagram Transport Layer Security (DTLS)," Request for Comments: 7366, Standards Track, Sep. 2014, 7 pages.

Dang, Q., "Recommendation for Applications Using Approved Hash Algorithms," United States of America Department of Commerce, NIST Special Publication 800-107, Revision 1, Aug. 2012, 25 pages.

Khandelwal, N., "New in 7.9: Fool Proof URL Protection With URL Encryption," Blog Barracuda, Oct. 10, 2014, <https://blog.barracuda.com/2014/10/10/new-in-7-9-fool-proof-url-protection-with-url-encryption/> [retreived Oct. 1, 2015], 6 pages.

Maccárthaigh, C.G., "Handshake Offload," U.S. Appl. No. 14/741,384, filed Jun. 16, 2015.

Atkinson, R., "Security Architecture for the Internet Protocol," Request for Comments: 1825, Standards Track, Aug. 1995, 23 pages.

Atkinson, R., "IP Authentication Header," Request for Comments: 1826, Standards Track, Aug. 1995, 14 pages.

Atkinson, R., "IP Encapsulating Security Payload (ESP)," Request for Comments: 1827, Standards Track, Aug. 1995, 13 pages.

Metzger, P., et al., "IP Authentication Using Keyed MD5," Request for Comments: 1828, Standards Track, Aug. 1995, 6 pages.

Karn, P., et al., "The ESP DES-CBC Transform," Request for Comments: 1829, Standards Track, Aug. 1995, 11 pages.

Dierks, T., et al., "The TLS Protocol Version 1.0," Request for Comments: 2246, Standards Track, Jan. 1999, 80 pages.

Kent, S., "Security Architecture for the Internet Protocol," Request for Comments: 2401, Standards Track, Nov. 1998, 62 pages.

Orman, H., "The Oakley Key Determination Protocol," Request for Comments: 2412, Informational, Nov. 1998, 56 pages.

Newman, C., "Using TLS with IMAP, POP3 and ACAP," Request for Comments: 2595, Standards Track, Jun. 1999, 15 pages.

Medvinsky, A., et al., "Addition of Kerberos Cipher Suites to Transport Layer Security (TLS)," Request for Comments: 2712, Standards Track, Oct. 1999, 7 pages.

Khare, R., et al., "Upgrading to TLS Within HTTP/1.1," Request for Comments: 2817, Standards Track, May 2000, 13 pages.

Rescorla, E., "HTTP Over TLS," Request for Comments: 2818, Informational, May 2000, 7 pages.

Hoffman, P., "SMTP Service Extension for Secure SMTP over Transport Layer Security," Request for Comments: 3207, Standards Track, Feb. 2002, 9 pages.

Chown, P., "Advanced Encryption Standard (AES) Ciphersuites for Transport Layer Security (TLS)," Request for Comments: 3268, Standards Track, Jun. 2002, 7 pages.

Blake-Wilson, S., et al., "Transport Layer Security (TLS) Extensions," Request for Comments: 3546, Standards Track, Jun. 2003, 29 pages.

Hollenbeck, S., "Transport Layer Security Protocol Compression Methods," Request for Comments: 3749, Standards Track, May 2004, 8 pages.

Friend, R., "Transport Layer Security (TLS) Protocol Compression Using Lempel-Ziv-Stac (LZS)," Request for Comments: 3943, Informational, Nov. 2004, 13 pages.

Moriai, S., et al., "Addition of Camellia Cipher Suites to Transport Layer Security (TLS)," Request for Comments: 4132, Standards Track, Jul. 2005, 7 pages.

(56) References Cited

OTHER PUBLICATIONS

Lee, H.J., et al., "Addition of Seed Cipher Suites to Transport Layer Security (TLS)," Request for Comments: 4162, Standards Track, Aug. 2005, 6 pages.

Ford-Hutchinson, P., "Securing FTP with TLS," Request for Comments: 4217, Standards Track, Oct. 2005, 29 pages.

Lehtinen, S., and C. Lonvick, "The Secure Shell (SSH) Protocol Assigned Numbers," Request for Comments: 4250, Standards Track, Jan. 2006, 19 pages.

Ylonen, T., and C. Lonvick, "The Secure Shell (SSH) Protocol Architecture," Request for Comments: 4251, Standards Track, Jan. 2006, 28 pages.

Ylonen, T., and C. Lonvick, "The Secure Shell (SSH) Authenication Protocol," Request for Comments: 4252, Standards Track, Jan. 2006, 16 pages.

Ylonen, T., and C. Lonvick, "The Secure Shell (SSH) Transport Layer Protocol," Request for Comments: 4253, Standards Track, Jan. 2006, 30 pages.

Ylonen, T., and C. Lonvick, "The Secure Shell (SSH) Connection Protocol," Request for Comments: 4254, Standards Track, Jan. 2006, 23 pages.

Schlyter, J., and W., Griffin, "Using DNS to Securely Publish Secure Shell (SSH) Key Fingerprints," Request for Comments: 4255, Standards Track, Jan. 2006, 9 pages.

Cusack, F., and M. Forssen, "Generic Message Exchange Authenticatioin for the Secure Shell Protocol (SSH)," Request for Comments: 4256, Standards Track, Jan. 2006, 12 pages.

Eronen, P., and H. Tschofenig, "Pre-Shared Key Ciphersuites for Transport Layer Security (TLS)," Request for Comments: 4279, Standards Track, Dec. 2005, 15 pages.

Kent, S., and K. Seo, "Security Architecture for the Internet Protocol," Request for Commnets: 4301, Standards Track, Dec. 2005, 102 pages.

Kent, S., "IP Encapsulating Security Payload (ESP)," Request for Comments: 4303, Standards Track, Dec. 2005, 45 pages.

Housley, R., "Using Advanced Encryption Standard (AES) CCM Mode With IPsec Encapsulating Security Payload (ESP)," Request for Comments: 4309, Standards Track, Dec. 2005, 14 pages.

Galbraith, J., and P. Remaker, "The Secure Shell (SSH) Session Channel Break Extension," Request for Comments: 4335, Standards Track, Jan. 2006, 6 pages.

Bellare, M., et al., "The Secure Shell (SSH) Transport Layer Encryption Modes," Request for Comments: 4344, Standards Track, Jan. 2006, 12 pages.

Harris, B., "Improved Arcfour Modes for the Secure Shell (SSH) Transport Layer Protocol," Request for Comments: 4345, Standards Track, Jan. 2006, 5 pages.

Rescorla, E., and N. Modadugu, "Datagram Transport Layer Security," Request for Comments: 4347, Standards Track, Apr. 2006, 25 pages.

Blake-Wilson, S., et al., "Transport Layer Security (TLS) Extensions," Request for Comments: 4366, Standards Track, Apr. 2006, 30 pages.

Friedl, M., et al., "Diffie-Hellman Group Exchange for the Secure Shell (SSH) Transport Layer Protocol," Request for Comments: 4419, Standards Track, Mar. 2006, 10 pages.

Harris, B., "RSA Key Exchange for the Secure Shell (SSH) Transport Layer Protocol," Request for Comments: 4432, Standards Track, Mar. 2006, 8 pages.

Hutzelman, J., et al., "Generic Security Service Application Program Interface (GSS-API) Authentication and Key Exchange for the Secure Shell (SSH) Protocol," Request for Comments: 4462, Standards Track, May 2006, 28 pages.

Blake-Wilson, S., et al., "Elliptic Curve Cryptography (ECC) Cipher Suites for Transport Layer Security (TLS)," Request for Comments: 4492, Informational, May 2006, 35 pages.

Santesson, S., "TLS Handshake Message for Supplemental Data," Request for Comments: 4680, Standards Track, Sep. 2006, 9 pages.

Santesson, S., et al., "TLS User Mapping Extension," Request for Comments: 4681, Standards Track, Oct. 2006, 11 pages.

Galbraith, J. and R. Thayer, "The Secure Shell (SSH) Public Key File Format," Request for Comments: 4716, Nov. 2006, 11 pages.

Blumenthal, U., and P. Goel, "Pre-Shared Key (PSK) Ciphersuites with Null Encryption for Transport Layer Security (TLS)," Request for Comments: 4785, Standards Track, Jan. 2007, 5 pages.

Galbraith, J., et al., "Secure Shell Public Key Subsystem," Request for Comments: 4819, Standards Track, Mar. 2007, 18 pages.

Taylor, D., et al., "Using the Secure Remote Password (SRP) Protocol for TLS Authentication," Request for Comments: 5054, Informational, Nov. 2007, 25 pages.

Salowey, J., et al., "Transport Layer Security (TLS) Session Resumption without Server-Side State," Request for Comments: 5077, Standards Track, Jan. 2008, 21 pages.

Mavrogiannopoulos, N., "Using OpenPGP Keys for Transport Layer Security (TLS) Authentication," Request for Comments: 5081, Experimental, Nov. 2007, 9 pages.

\* cited by examiner

LEVERAGING TRANSPORT-LAYER CRYPTOGRAPHIC MATERIAL

BACKGROUND

Securing network communications is a difficult problem faced in many computing environments. When client computer systems communicate with online services, information may be transmitted over computer networks that are not under the direct control of either party to the communication. As a result, encryption is sometimes used to secure information flowing over a computer network between a client and an online service. Secure transport layer protocols such as Transport Layer Security ("TLS") or Secure Sockets Layer ("SSL") safeguard network communications by encrypting and decrypting data within the network stack. Applications on the client-side and the server-side exchange plaintext data with their respective secure transport layers, and the encryption and decryption operations can occur without interference or assistance from either application.

Secure transport layers are often used to protect data while the data is in transit over a computer network, but the protection afforded by a secure transport layer generally does not extend to the application layer. Secure transport layers do not generally contribute to data security before transmission or after reception by an application. For example, TLS/SSL may improve the security and integrity of data while the data is in the custody of the transport layer, but generally does not contribute to data security while the data is in the custody of an application.

BRIEF DESCRIPTION OF THE DRAWINGS

Various embodiments in accordance with the present disclosure will be described with reference to the drawings, in which.

DETAILED DESCRIPTION

Figure 1:
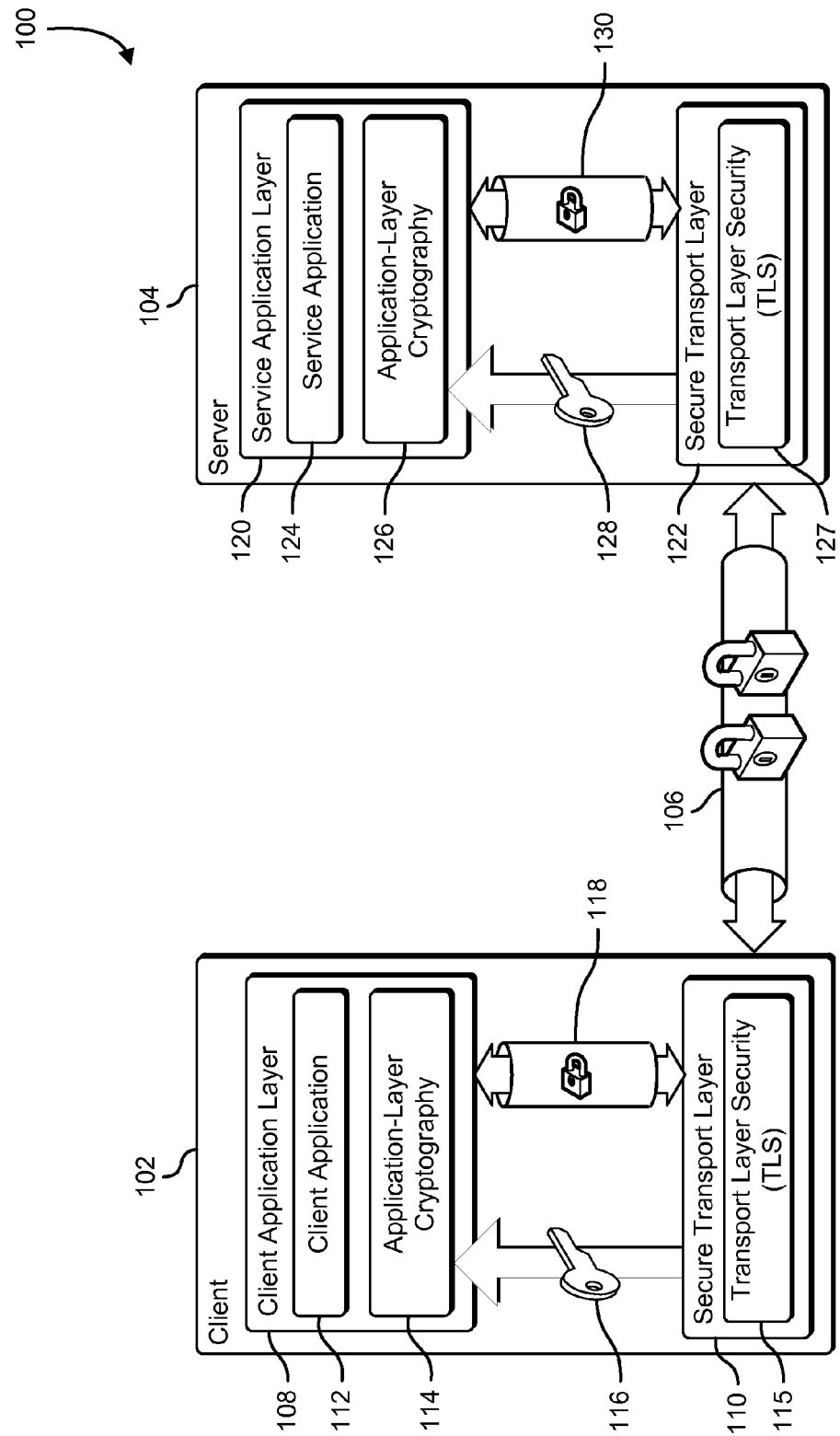
FIG. 1 shows an illustrative example of an environment in which various embodiments may be practiced.

The present document describes systems and methods that provide application-layer cryptographic services by leveraging cryptographic material negotiated as part of establishing a secure transport-layer connection. A secure transport-layer connection may be established using a transport layer that implements a secure transport protocol such as TLS. A client application and a service application establish a secure connection over a computer network using a transport layer that operates in accordance with a secure transport protocol. As part of establishing the secure connection, the transport layer negotiates one or more shared secrets that are associated with the secure connection. The shared secrets may include a pre-master secret, a master secret, or other cryptographic key used by the transport layer to encrypt and decrypt information exchanged over the secure connection. An application-layer cryptography component derives an application-level cryptographic key from the shared secrets provided by the transport layer, and the application-level cryptographic key is used by the client application and the service application to encrypt and decrypt sensitive application data at the application level. The client application and the service application are able to exchange encrypted sensitive application data over the secure connection and maintain encryption of the sensitive application data outside the application layer. By reusing transport-layer cryptographic material from a secure transport-layer connection to protect data at the application-layer, the transport-layer cryptographic material is pre-shared between the two endpoints of the secure transport-layer connection. One benefit of this approach is that, in many examples, application-level encryption may be achieved without exchanging additional cryptographic credentials.

Application-level cryptographic services are performed according to particular cryptographic algorithms that rely upon cryptographic keys having particular characteristics. The shared secrets provided by the transport layer depend upon the particular secure transport protocols implemented by the transport layer and are, in general, not within the direct control of an application. The application can select a compatible cryptographic algorithm based at least in part on the characteristics of the shared secrets provided by the transport layer, or as an alternative, the application can derive a cryptographic key from the shared secrets that is compatible with a desired cryptographic algorithm by manipulating the provided shared secrets with key derivation functions. Examples of key derivation functions include cryptographic hash functions, and key stretching algorithms. Key stretching algorithms such as Password-based Key Derivation Function 2 ("PBKDF2") or Scrypt may be used to derive stronger keys from shared secrets, facilitating the use of stronger cryptographic algorithms at the application layer than may be supported by the transport layer.

The shared secret information provided by the transport layer may be manipulated to protect the underlying security of the transport layer. In some examples, shared secret information provided by the transport layer is manipulated by processing the shared secret information using a one-way function such as a cryptographic hash function, so that the underlying transport-layer cryptographic information cannot be easily recovered. A one-way function is a function that is computationally difficult to invert, but relatively easy to compute for a given input. In another example, a key derivation function is used to manipulate the shared secret information into an application-layer cryptographic key.

Information encrypted by a client application can sometimes be decrypted before it is received by a corresponding server application. In some examples, an application-layer decryption component can be provided within a transport layer or may operate as a separate service. The application-layer decryption component derives matching cryptographic keys by accessing the shared secret information from the transport layer, decrypts the application-encrypted data, and provides the plaintext data to the destination service. In another example, an application-layer decryption component is implemented within a network appliance, such as a load balancer.

By encrypting sensitive application data at an application layer, the potential for information leakage is reduced. For example, Web applications sometimes embed sensitive information in one or more HTTP GET parameters, or as part of a path after the domain name of a URL. Even when a secure transport protocol is used, the secure transport protocol merely provides security for the sensitive information as it is being transmitted between the endpoints of the secure transport connection. The URL, including the sensitive information, may be accessed by other applications and operating system components on the local computer system. For example, in some environments URLs are copied into a browser-history store on the local computer system, stored within log files of proxy servers and Web servers, or passed to third-party websites in a referrer header. By encrypting the sensitive information at the application level, sensitive data maintained in URLs or transmitted as HTTP GET parameters remains in encrypted form when accessed by other operating system components or applications.

The recipient of a URL that includes application-level encrypted data can decrypt the encrypted data in a number of ways. In some implementations, a transport layer on the recipient computer system extracts the encrypted data from the URL, decrypts the encrypted data to acquire the plaintext data and adds the unencrypted data to an HTTP header. A secure channel is used to provide the HTTP header to the application. In another implementation, the receiving transport layer shares the application-layer cryptographic key with the destination application and the destination application decrypts the encrypted data contained within the URL.

Applications that wish to maintain encrypted application data long-term may store the derived application-layer key in application memory, or may re-encrypt received encrypted data with a locally maintained cryptographic key. In various examples, the cryptographic material provided by the transport layer to the application layer is associated with a secure network connection. When the secure network connection is terminated, the transport layer deletes the cryptographic material because the cryptographic material is no longer needed to maintain the secure network connection. Applications that require access to encrypted data after the secure network connection is terminated may store the application-layer cryptographic keys for later use, or may decrypt and re-encrypt the application-encrypted data with an application-generated and maintained cryptographic key.

Additional cryptographic material such as digital certificates may be leveraged from the transport layer to support long-term application-layer encryption such as bookmarks. For example, as part of a TLS handshake, a Web server provides a client with a copy of the Web server's digital certificate. The Web server's digital certificate includes a public cryptographic key that is owned by the Web server. When the client stores a bookmark for a webpage located on the Web server, the client encrypts the bookmark using the public cryptographic key from the Web server's digital certificate. When the Web server receives the encrypted bookmark URL, the Web server decrypts the encrypted bookmark URL with the private cryptographic key to acquire the original URL. The client can add a connection-specific pre-shared value, such as a salt value, to the cryptographic operations so that the encrypted bookmark URLs are client specific.

FIG. 1 shows an illustrative example of an environment in which various embodiments may be practiced. A diagram 100 illustrates a system that includes a client computer system 102 and a server computer system 104. The client computer system 102 and the server computer system 104 communicate over a secure transport connection 106 such as a TLS connection, an SSL connection, a Virtual Private Network ("VPN") connection, or an IPsec connection. The client computer system 102 includes a client application layer 108 and a secure transport layer 110. The client application layer 108 includes application programs and services that run within the application space of the client computer system 102. A client application 112 provides various user interfaces, business logic, and connectivity functions to access a corresponding service application that runs on the server computer system 104. In some embodiments, the client application 112 is a JavaScript application running within a web browser. An application-layer cryptography component 114 resides within the application layer. The application-layer cryptography component 114 may be implemented as a code module within a specific application, an application service, or as a static or dynamic application library. The application-layer cryptography component 114 provides cryptographic functions to the client application 112. The cryptographic functions may include encryption, decryption, digital signing, and signature verification functions. The secure transport layer 110 provides transport-level network connectivity to applications and services in the client application layer 108. The secure transport layer 110 may include one or more transport protocol components that implement secure transport-level protocols such as TLS, SSL, IPSec, or other secure transport protocols. In the implementation shown in FIG. 1, the secure transport layer 110 includes a transport layer security component 115 that implements a version of the TLS protocol. The transport layer security component 115 is a code module in a network stack on the client computer system 102. The transport layer security component 115 may implement TLS version 1.0, 1.1, 1.2, 1.3, SSL V3.0, or other secure transport protocol that negotiates shared-secret cryptographic material as part of establishing a connection between the client computer system 102 and the server computer system 104. An application-layer cryptographic key 116 is derived from the shared-secret cryptographic material produced by the transport layer security component 115, and provided from the secure transport layer 110 to the application-layer cryptography component 114. The application-layer cryptography component 114 exchanges encrypted application data with the secure transport layer 110 over an application-layer encrypted channel 118. The application-layer encrypted channel 118 can be a system call, a call to a system service, a system message, or an Application Programming Interface ("API") call.

The server computer system 104 hosts a set of applications, services, and code components that are arranged in a service application layer 120 and a secure transport layer 122. The service application layer 120 includes a service application and an application-layer cryptography component 126. The service application 124 implements functions associated with a service provided to the client application 112. In some embodiments, the service application can be a web server. The application-layer cryptography component 126 provides cryptographic functions to the service application 124. The secure transport layer 122 includes a transport layer security component 127. The transport layer security component 127 implements a secure transport protocol corresponding to the secure transport protocol implemented by the transport layer security component 115. An application-layer cryptographic key 128 that matches the application-layer cryptographic key 116 is provided by the secure transport layer 122 to the application-layer cryptography component 126. Application-encrypted data is exchanged between the application-layer cryptography component and the secure transport layer 122 via an application-layer encrypted channel 130.

In various examples, the client application 112 communicates with the service application 124 over the secure transport connection 106. For application data that is not sensitive, the client application 112 and the service application 124 exchange unencrypted data with the secure transport layer 110 and the secure transport layer 122. The transport layer security component 115 and the transport layer security component 127 encrypt and exchange information over the secure transport connection 106. The data exchanged between the client application 112 and the secure transport layer 110 and the data exchanged between the service application 124 and the secure transport layer 122 is exchanged in an unencrypted form. The data exchanged between the transport layer security component 115 and the transport layer security component 127 is exchanged in an encrypted form.

However, for example, if sensitive application data is identified by the client application 112, the sensitive application data is provided by the client application 112 to the application-layer cryptography component 114 for encryption. The application-layer cryptography component 114 acquires the application-layer cryptographic key 116 from the secure transport layer 110. The application-layer cryptographic key 116 is derived from shared-secret cryptographic material generated by the transport layer security component 115. In some implementations, the application-layer cryptographic key 116 is a session key associated with a TLS connection used by the client application 112 to communicate with the service application 124. In another implementation, the application-layer cryptographic key 116 is derived from shared secret information that is associated with a TLS connection used by the client application 112 to communicate with the service application 124. The application-layer cryptographic key 116 may be derived from the shared secret information using a one-way function, cryptographic hash function, or key stretching algorithm that produces a cryptographic key that is compatible with a cryptographic algorithm implemented by the application-layer cryptography component 114. The application-layer cryptography component 114 encrypts the sensitive application data, and provides the encrypted sensitive application data to the secure transport layer 110 in encrypted form. The transport layer security component 115 provides an additional level encryption and transmits the encrypted sensitive application data to the server computer system 104 over the secure transport connection 106.

When the encrypted sensitive application data is received by the server computer system 104 at the secure transport layer 122, the transport layer security component 127 removes the transport-level encryption added by the secure transport layer 110, and provides the encrypted sensitive application data to the application-layer cryptography component 126 within the service application layer 120. The secure transport layer 122 derives the application-layer cryptographic key 128 using cryptographic material provided by the transport layer security component 127. The cryptographic material provided to the transport layer security component 127 matches the cryptographic material provided by the transport layer security component 115 on the client computer system 102, thereby enabling the creation of matching application-layer cryptographic keys. The secure transport layer 122 provides the application-layer cryptographic key 128, which matches the application-layer cryptographic key 116, to the application-layer cryptography component 126. The application-layer cryptography component 126 decrypts the encrypted sensitive application data, and provides the sensitive application data to the service application 124.

The service application 124 can encrypt a reply to the client application 112 by providing the reply to the application-layer cryptography component 126. The application-layer cryptography component 126 encrypts the reply, and provides the encrypted reply to the secure transport layer 122. The encrypted reply is transmitted over the secure transport connection 106 to the client computer system 102 where it is received by the secure transport layer 110. The secure transport layer 110 provides the encrypted reply to the application-layer cryptography component 114 within the client application layer 108. Using the application-layer cryptographic key 116, the application-layer cryptography component 114 decrypts the encrypted reply, and provides the reply to the client application 112.

In some environments, an application uses the application-layer cryptographic key to perform cryptographic operations on application data that is maintained within a computer system that hosts the application. In one example, the secure transport layer 110 provides the application-layer cryptography component 114 with the application-layer cryptographic key 116, and the client application 112 uses the application-layer cryptography component 114 to perform encryption and decryption operations on application data within the client application layer 108. The encrypted application data may be stored locally on the client computer system 102, and decrypted by the application-layer cryptography component 114 at a later time.

Figure 2:
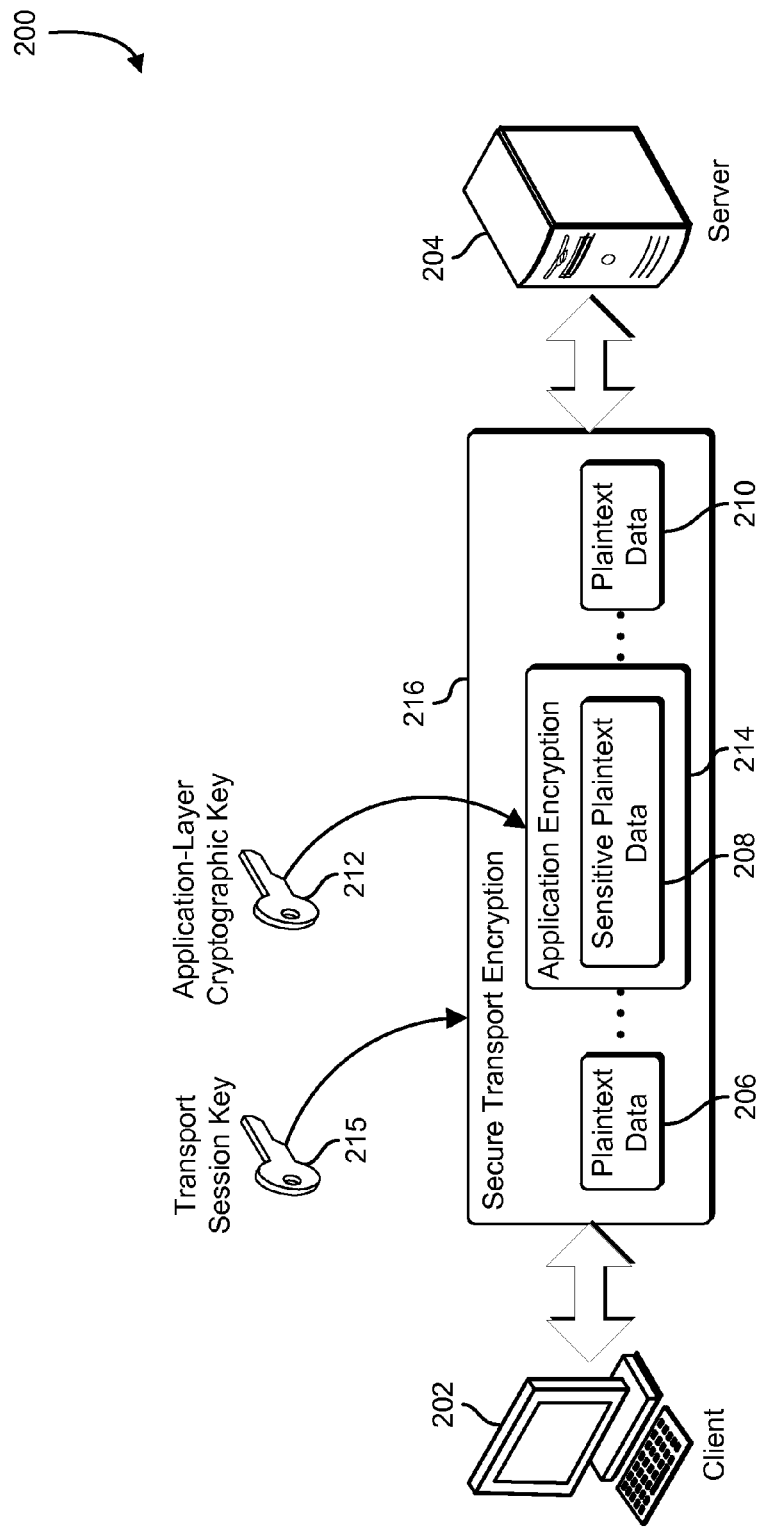
FIG. 2 shows an illustrative example of encrypted sensitive data being transmitted over a secure transport-layer connection between a client application and a service application, in accordance with an embodiment.

FIG. 2 shows an illustrative example of encrypted sensitive data being transmitted over a secure transport-layer connection between a client application and a service application, in accordance with an embodiment. A diagram 200 includes a client computer system 202 and a server computer system 204. The client computer system 202 communicates with the server computer system 204 over a secure transport connection such as TLS. A first plaintext data segment 206, a sensitive plaintext data segment 208, and a second plaintext data segment 210 are transmitted between the client computer system 202 and the server computer system 204. An application-layer cryptographic key 212 is used to apply application encryption to the sensitive plaintext data segment 208 to produce application-encrypt sensitive plaintext data 214. The secure transport protocols implemented on the client computer system 202 and the server computer system 204 utilize a transport session key 215 to apply secure transport encryption 216 to the first plaintext data segment 206, the application-encrypted sensitive plaintext data segment 208, and the second plaintext data segment 210.

The data pattern illustrated in FIG. 2 may be generated when a client application and a server application selectively perform application-level encryption of sensitive data transmitted between the client application and the server application. In one example, the client application on the client computer system 202 establishes a secure transport connection to the server computer system 204. The client computer transmits the second plaintext data segment 210 to the server computer system by providing the second plaintext data segment 210 to a transport layer in unencrypted form. After providing the second plaintext data segment 210 to the transport layer, the client computer identifies sensitive data, and sends the sensitive plaintext data to an application-layer cryptographic component which encrypts the data and provides the application encrypted sensitive plaintext data 214. After providing the application-encrypted sensitive plaintext data 214 to the transport layer, the first plaintext data segment 206 is provided to the transport layer. The resulting data transmission illustrated in FIG. 2 illustrates that by providing application-level encryption, sensitive data may be protected by two levels of nested encryption while in transit between the client computer system 202 and the server computer system 204.

Figure 3:
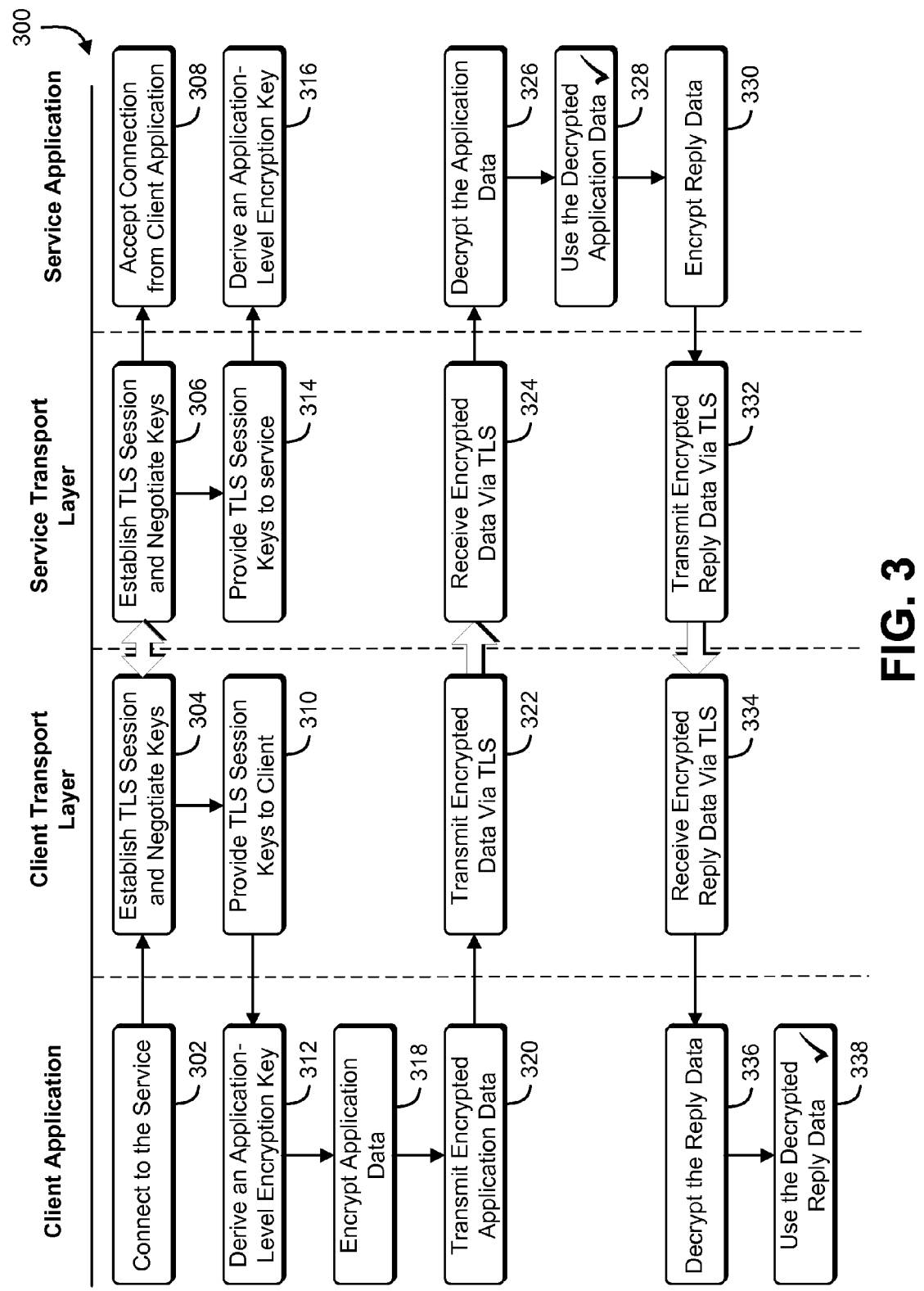
FIG. 3 shows an illustrative example of a process that, when performed by a client application, a client transport, a service application, and a service transport, performs application-layer encryption and decryption on data exchanged between the client application and the service application, in accordance with an embodiment.

FIG. 3 shows an illustrative example of a process that, when performed by a client application, a client transport, a service application, and a service transport, performs application-layer encryption and decryption on data exchanged between the client application and the service application, in accordance with an embodiment. A swim diagram 300 illustrates a process that begins at block 302 where a client application connects to a service provided by a service application. The connection request causes a client transport layer to establish 304 a TLS session to a corresponding service transport layer on a server computer system. As part of establishing the TLS session, the client transport layer negotiates a set of session keys with the service transport layer that is shared with the service transport layer. The service transport layer participates in establishing 306 the TLS session and negotiating the session keys, and indicates to the service application that the client application is requesting a connection. The service application accepts 308 the connection request from the client, resulting in the end-two-and secure connection being established from the client application to the service application.

At block 310, the client transport layer extracts the session keys associated with the TLS session, and provides the TLS session keys to the client application. The client application derives 312 an application-level cryptographic key from the TLS session keys. The application-level cryptographic key may be derived from the TLS session keys, a pre-shared secret, a premaster secret, or master secret maintained by the client transport layer and associated with the TLS session. In some implementations, the application-level cryptographic key is derived from a combination of the above shared secrets.

At block 314, the service transport layer extracts the session keys associated with the TLS session and provides the TLS session keys to the service application. The service application derives 316 and application-level cryptographic key from the TLS session keys. The application-level cryptographic key is derived by the service application in the same way and from the same shared secrets as the application-level cryptographic key derived by the client application. As a result, the application-level cryptographic key derived by the service application matches the application-level cryptographic key derived by the client application, and the client application and the service application are able to exchange sensitive data that is encrypted using the application-level cryptographic key.

At block 318, the client application identifies sensitive client data and encrypts the sensitive client data using the application-level cryptographic key derived by the client application. The encrypted sensitive client data is provided 320 to the client transport layer. The client transport layer transmits 322 the encrypted sensitive client data over the established TLS connection to the service transport layer. The service transport layer receives 324 the encrypted sensitive client data, and provides the encrypted sensitive client data to the service application. The service application decrypts 326 the encrypted sensitive client data using the application-level cryptographic key derived by the service application. At block 328, the service application has gained access to the decrypted sensitive client data and may use the sensitive client data for any purpose. At block 330, the service application generates a reply to the client application and encrypts the reply using the application-level cryptographic key derived by the service application. The encrypted reply is provided to the service transport layer, and the service transport layer transmits 332 the encrypted reply data to the client transport layer. At block 334, the client transport layer receives the encrypted reply and provides the encrypted reply to the client application. At block 336, the client application decrypts the encrypted reply using the application-level cryptographic key derived by the client application. At block 338, the client application gains access to the reply in plaintext form.

Figure 4:
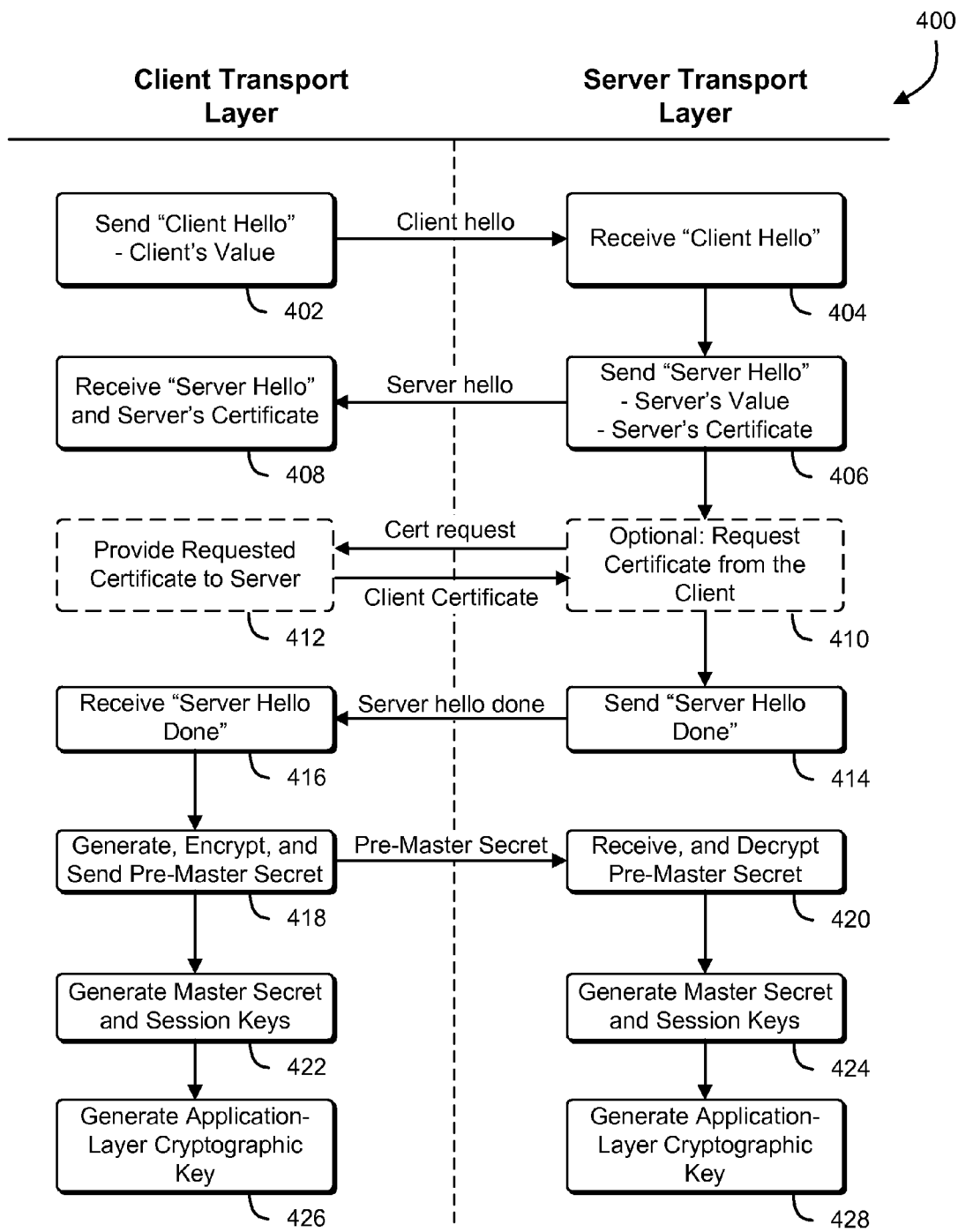
FIG. 4 shows an illustrative example of a process that, when performed by a client transport layer, and a server transport layer, establishes shared transport-layer and application-layer cryptographic keys, in accordance with an embodiment.

FIG. 4 shows an illustrative example of a process that, when performed by a client transport layer and a server transport layer, establishes shared transport-layer and application-layer cryptographic keys, in accordance with an embodiment. A swim diagram 400 illustrates a process that negotiates shared secret information and derives an application-layer cryptographic key as part of establishing a TLS session. The process begins at block 402 where the client transport layer sends a client hello message that includes a seed value to the server transport layer. The server transport layer receives 404 the client hello message with the client's seed value, and at block 406 responds by sending a server hello message to the client transport layer. The server hello message includes a seed value generated by the server transport layer and a digital certificate belonging to the server. At block 408, the client transport layer receives the server hello message from the server transport layer, along with the server's digital certificate. The signatures on the server's digital certificate can be validated by the client to confirm the identity of the server.

In some implementations, the client transport layer provides the client's digital certificate to the server. At block 410, the server transport layer requests a certificate from the client. At block 412, the client transport layer receives the request for the client's digital certificate and provides the client's digital certificate to the server. The server transport layer receives client's digital certificate at block 410, and can validate the signatures on the client's digital certificate to confirm the identity of the client. At block 414, the server transport layer sends a server hello done message to complete the handshake. The client transport layer receives the server hello done message at block 416.

At block 418, the client transport layer generates the premaster secret. The premaster secret may be based on the seed values exchanged between the client and the server during the handshake, and any other pre-shared secret information maintained by the client and the server. In some implementations, the premaster secret is based at least in part on a randomly generated value. The premaster secret is encrypted using a public cryptographic key associated with the server's digital certificate, and sent to the server transport layer. At block 420, the server transport layer decrypts the premaster secret using a private cryptographic key associated with the server's digital certificate and corresponding to the public cryptographic key used to encrypt the premaster secret.

The client transport layer and the server transport layer generate master secret and session keys for use with a TLS session at blocks 422 and 424 respectively. At blocks 426 and 428, the client transport layer and the server transport layer generate application-layer cryptographic keys that are derived from the previously determined shared secret information such as the session keys, master secret, and premaster secret. The client transport layer and the server transport layer use derivation methods and input data that results in matching application-layer cryptographic keys being generated by the client transport layer and the server transport layer. In some implementations, the application-layer cryptographic key is generated using a one-way function such as a cryptographic hash so that an application provided with the application-layer cryptographic key will have difficulty deriving the underlying transport-layer cryptographic keys from which the application-layer cryptographic key is derived.

A one-way function is a function that is easy to evaluate for a given input, but hard to invert. That is, it is more difficult to determine the input given the output value of the function. Perfect one-way functions are not known to exist at the present time, however, practical candidates for one-way functions are known, and are difficult enough to invert to render them usable as one-way functions in practical use. The following candidates for one-way functions are suitable for use as one-way functions in practical systems and include multiplication and factoring problems, the Rabin function, discrete exponent and discrete logarithm problems, cryptographically secure hash functions, and elliptic curves.

It should be noted that the phrase "one-way function" includes functions that are not necessarily one-way in the strict mathematical sense, but that exhibit properties (such as collision resistance, preimage resistance and second preimage resistance) that render the function useful in contexts in which the various techniques of the present disclosure are applied. In this manner, an entity with output of the function but without access to the corresponding input, is unable to determine the input without, for instance, extraordinary expenditure of computational resources necessary for a cryptographic (e.g., brute force) attack. One-way functions (also referred to as "effectively one-way functions") include, but are not limited to, cryptographic hash functions such as message authentication codes, (e.g., hash-based message authentication code (HMAC)), key derivation functions, such as PBKDF2 and bcrypt (with the password being based at least in part on the plaintext and the cryptographic key, e.g.) and other secure randomization functions which may, but do not necessarily, have a domain (set of possible inputs) that is larger than their range (possible outputs). Other suitable functions (referred to as "f") for various embodiments include, but are not limited to, functions that take at least a plaintext and cryptographic key as input and that have a property of preimage resistance (given a value y, the probability of randomly generating an input x such that $f(x)=y$ is below a specified threshold), second preimage resistance (given an input x1, the probably of randomly generating another input x2, different from x1, such that $f(x1)=f(x2)$ is below a specified threshold) and/or collision resistance (the probability of two different inputs resulting in the same output is less than a specified threshold). The exact threshold for each probability may be context-dependent, with lower probabilities corresponding to higher security contexts. Hash functions usable as one-way functions in accordance with the techniques of the present disclosure include, but are not limited to, functions described in the National Institute of Standards and Technology (NIST) Special Publication 800-107, Revision 1 "Recommendation for Applications Using Approved Hash Algorithms," which is incorporated herein by reference.

Various cryptographically-protected protocols may be relied upon to provide a shared secret upon which an application-level cryptographic key may be based. The cryptographically-protected protocols may include protocols that operate outside the transport layer of the OSI model such as the data link layer, the network layer, or the session layer. For example, cryptographically-protected protocols which negotiate shared secret information using Diffie Hellman key exchange or quantum cryptography techniques can be used to supply shared secrets to a component in an application layer that performs application-level encryption.

Figure 5:
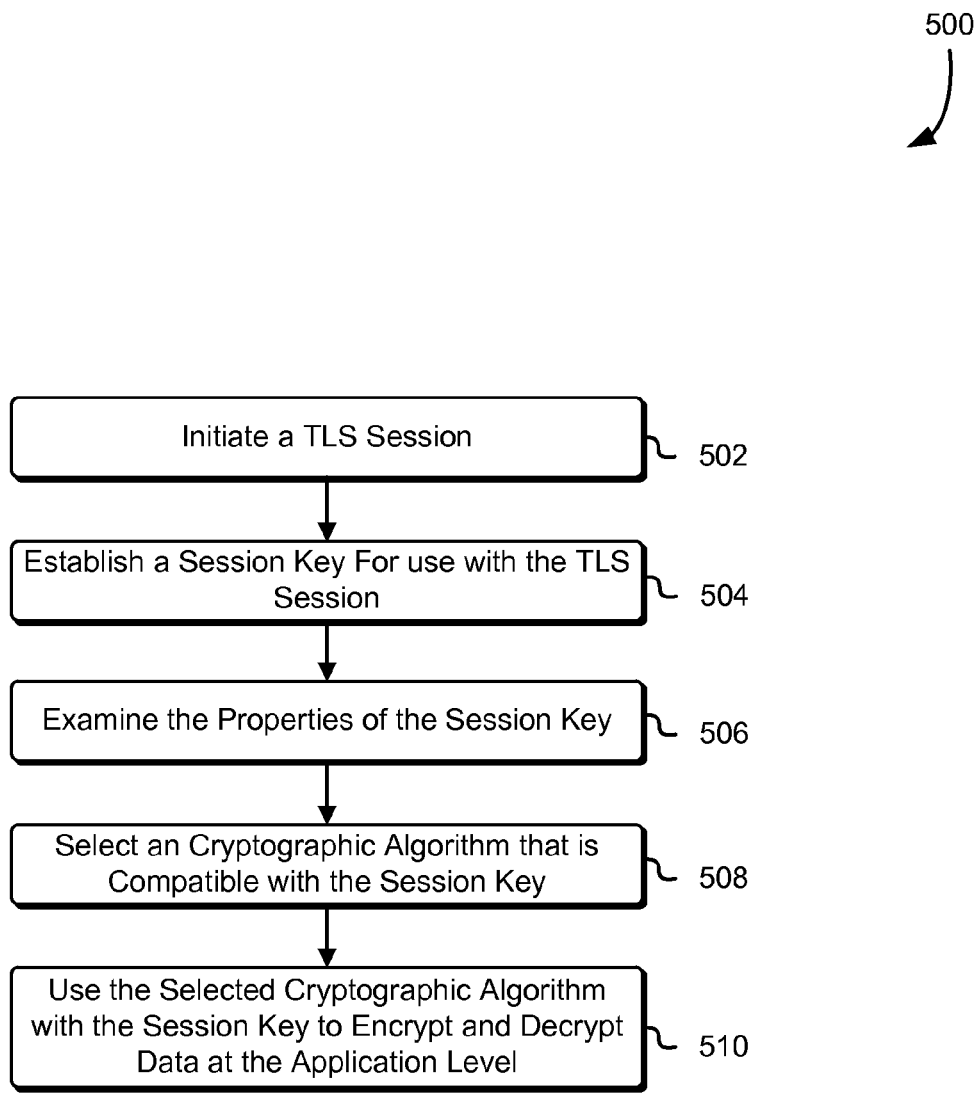
FIG. 5 shows an illustrative example of a process that, when performed by a computer system configures an application-layer cryptographic component based at least in part on the properties of a session key negotiated over a TLS connection, in accordance with an embodiment.

FIG. 5 shows an illustrative example of a process that, when performed by a computer system configures an application-layer cryptographic component based at least in part on the properties of a session key negotiated over a TLS connection, in accordance with an embodiment. A process diagram 500 illustrates a process that begins at block 502 where application initiates the establishment of a TLS session. At block 504, a session key for use during the TLS session is established. The session key may be established using a combination of random values and seed values exchanged between the endpoints of the TLS session. At block 506, the application layer examines the properties of the session key. In various implementations, the session key is generated in accordance with cryptographic algorithms used by the particular TLS implementation used by the application, and therefore may not be compatible with an arbitrary cryptographic algorithm selected by the application. At block 508, the application layer selects a cryptographic algorithm that is compatible with the identified properties of the established session key. In some implementations, the application layer selects a cryptographic algorithm that is based at least in part on the cryptographic algorithms used by the TLS implementation. If the application layer cannot identify a cryptographic algorithm that is compatible with the provided session key, the application layer may terminate the connection. At block 510, the application layer uses the identified cryptographic algorithm with the session key to cryptographically protect data at the application level. In some implementations data is cryptographically protected by encrypting and decrypting application data. In another implementation, the data is cryptographically protected by digitally signing application data and verifying digital signatures on application data. Digital signatures may be used without data encryption in environments where data integrity is desired, but data confidentiality is of little concern or addressed in other ways.

Figure 6:
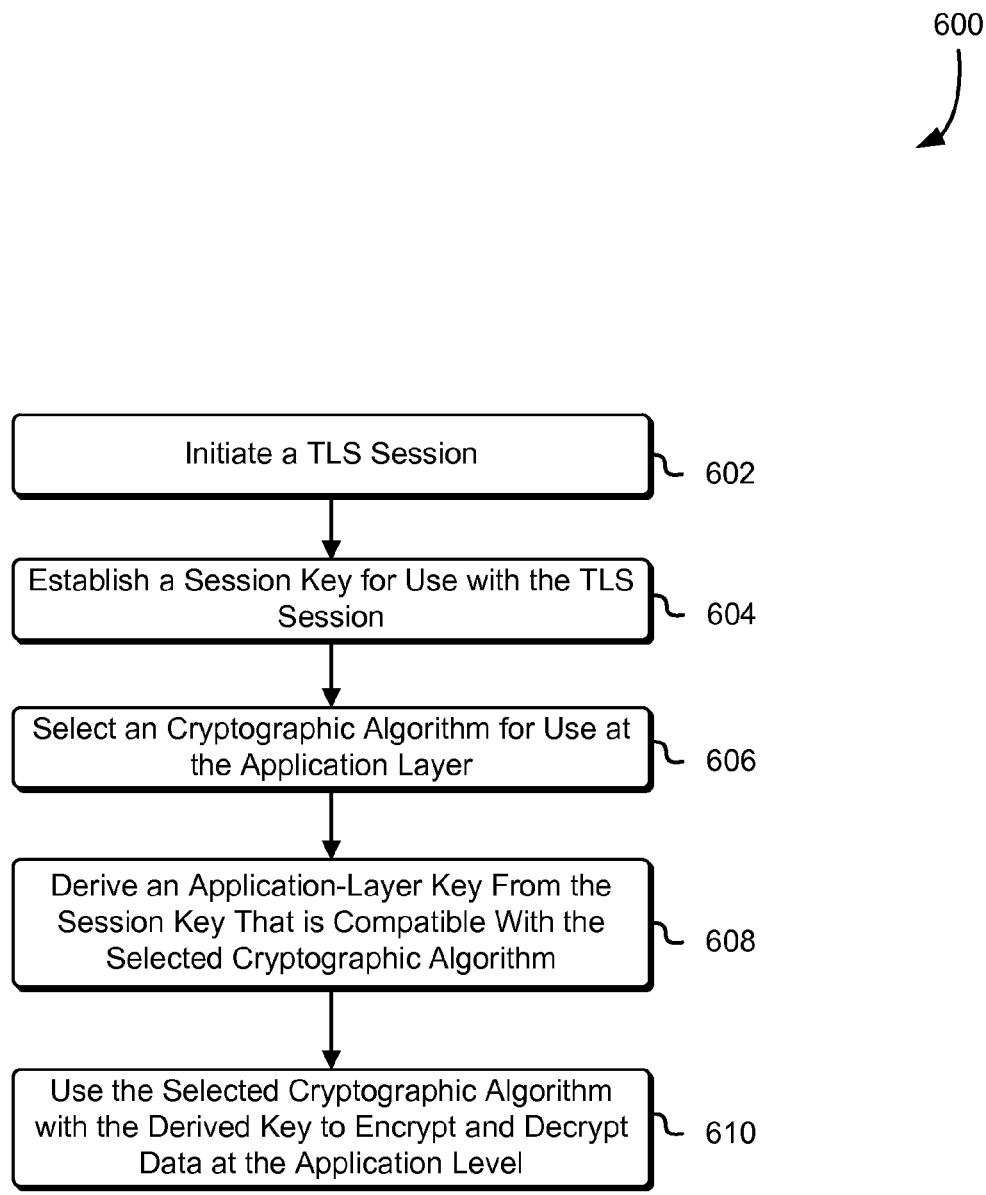
FIG. 6 shows an illustrative example of a process that, when performed by a computer system configures an application-layer cryptographic component based by generating a cryptographic-algorithm compatible application-layer key from a TLS session key, in accordance with an embodiment.

FIG. 6 shows an illustrative example of a process that, when performed by a computer system configures an application-layer cryptographic component based by generating a cryptographic-algorithm compatible application-layer key from a TLS session key, in accordance with an embodiment. A process 600 begins at block 602 with an application layer initiating a TLS connection or other secure transport connection. At block 604, a shared session key is negotiated by a TLS transport layer for use during the TLS session. The TLS transport layer may also negotiate a premaster secret and a master secret that are associated with the TLS session. The application layer selects a desired cryptographic algorithm for use in securing application data at the application level. The desired cryptographic algorithm may be selected based at least in part on the cryptographic strength of the desired cryptographic algorithm, and the set of cryptographic algorithms supported by a destination application. At block 608, the application layer determines a set of properties for an application-layer cryptographic key that satisfy the requirements of the desired cryptographic algorithm. The application layer derives a compatible application-layer cryptographic key from one or more of the shared session keys the premaster secret and the master secret associated with the TLS session. If necessary, key stretching algorithms may be employed to increase the entropy of the session key. In some implementations additional TLS connections may be created and shared secret information associated with the additional TLS connections is combined with shared secret information from the present TLS connection to form a larger key from which a longer application-layer cryptographic key may be derived. Once a compatible application-layer cryptographic key has been derived, the application layer uses the selected cryptographic algorithm to secure 610 application data at the application level. Application data may be secured by encrypting and decrypting application data or, in some embodiments, by digitally signing application data and then verifying the digital signatures on the application data.

Figure 7:
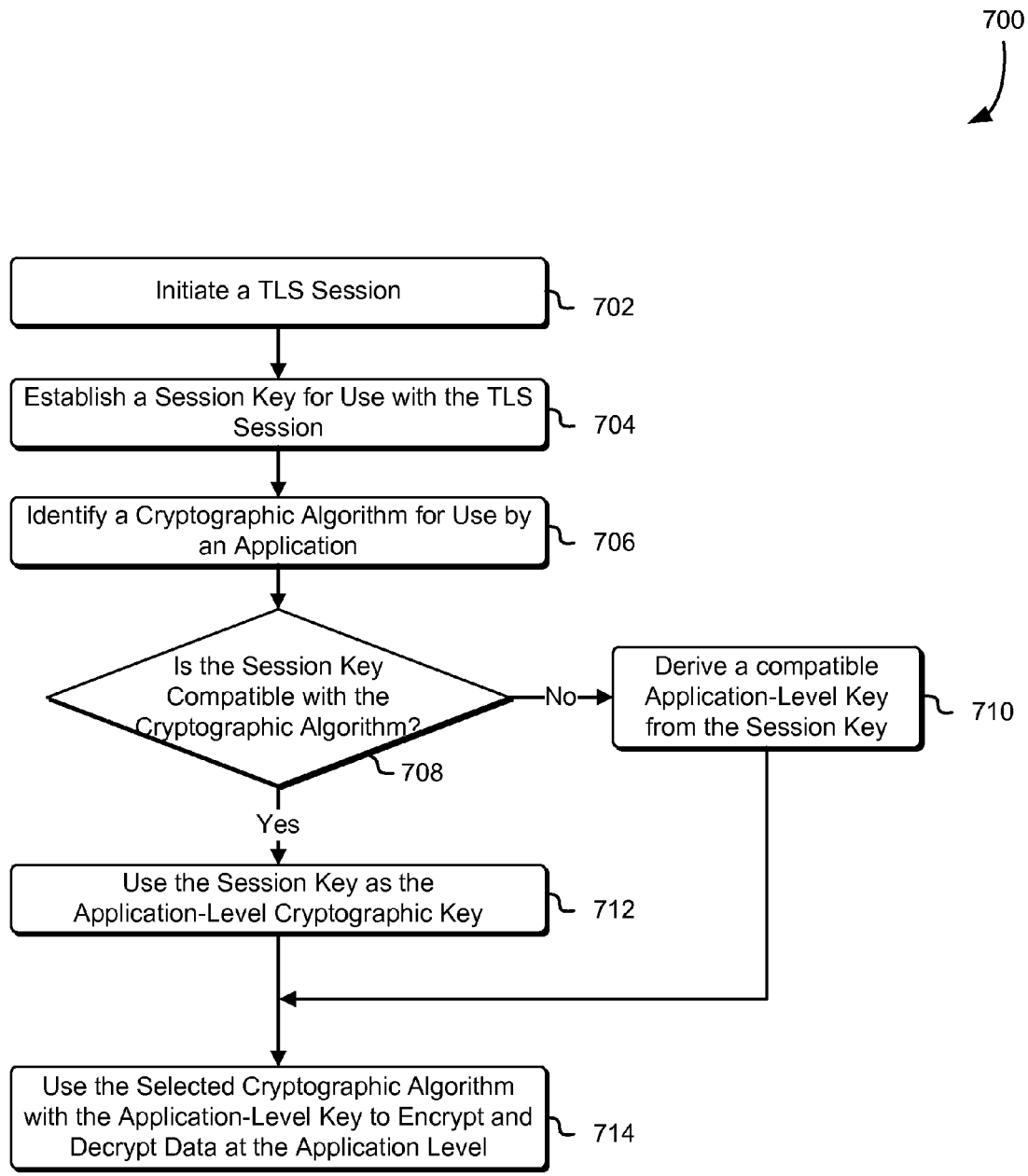
FIG. 7 shows an illustrative example of a process that, when performed by a computer system configures an application-layer cryptographic component by selectively adapting a cryptographic algorithm and an application-layer key, in accordance with an embodiment.

FIG. 7 shows an illustrative example of a process that, when performed by a computer system configures an application-layer cryptographic component by selectively adapting a cryptographic algorithm and an application-layer key, in accordance with an embodiment. A process diagram 700 illustrates a process that begins at block 702 with an application layer initiating a TLS session. The transport layer establishes 704 a session key for use with a TLS session. The transport layer may establish additional shared secret information such as a premaster secret and a master secret. At block 706, the application layer identifies a cryptographic algorithm for use in securing application data.

At decision block 708, the application layer examines the session key provided by the transport layer, and determines whether the session key is compatible with the identified cryptographic algorithm. If the provided session key is not compatible with the identified cryptographic algorithm, the application layer derives 710 a compatible application-level cryptographic key using shared secret information provided by the transport layer. The application-level cryptographic key may be derived from the session key, premaster secret, the master secret, or other shared secret information provided by the transport layer. The application-level cryptographic key may be derived using cryptographic hash functions, bitwise Boolean manipulation, concatenation, key stretching, and if necessary, additional shared-secret information acquired by creating additional TLS connections from the client to the service for the purpose of generating additional shared-secret information. If the provided session key is compatible with the identified cryptographic algorithm, execution proceeds to block 712 and the application layer uses the provided session as the application-level cryptographic key.

At block 714, the application layer uses the selected cryptographic algorithm with the application-level cryptographic key to encrypt and decrypt data at the application level. In some implementations, the application level uses the application-level cryptographic key to digitally sign application data before it is transmitted and to verify signed application data that is received.

Figure 8:
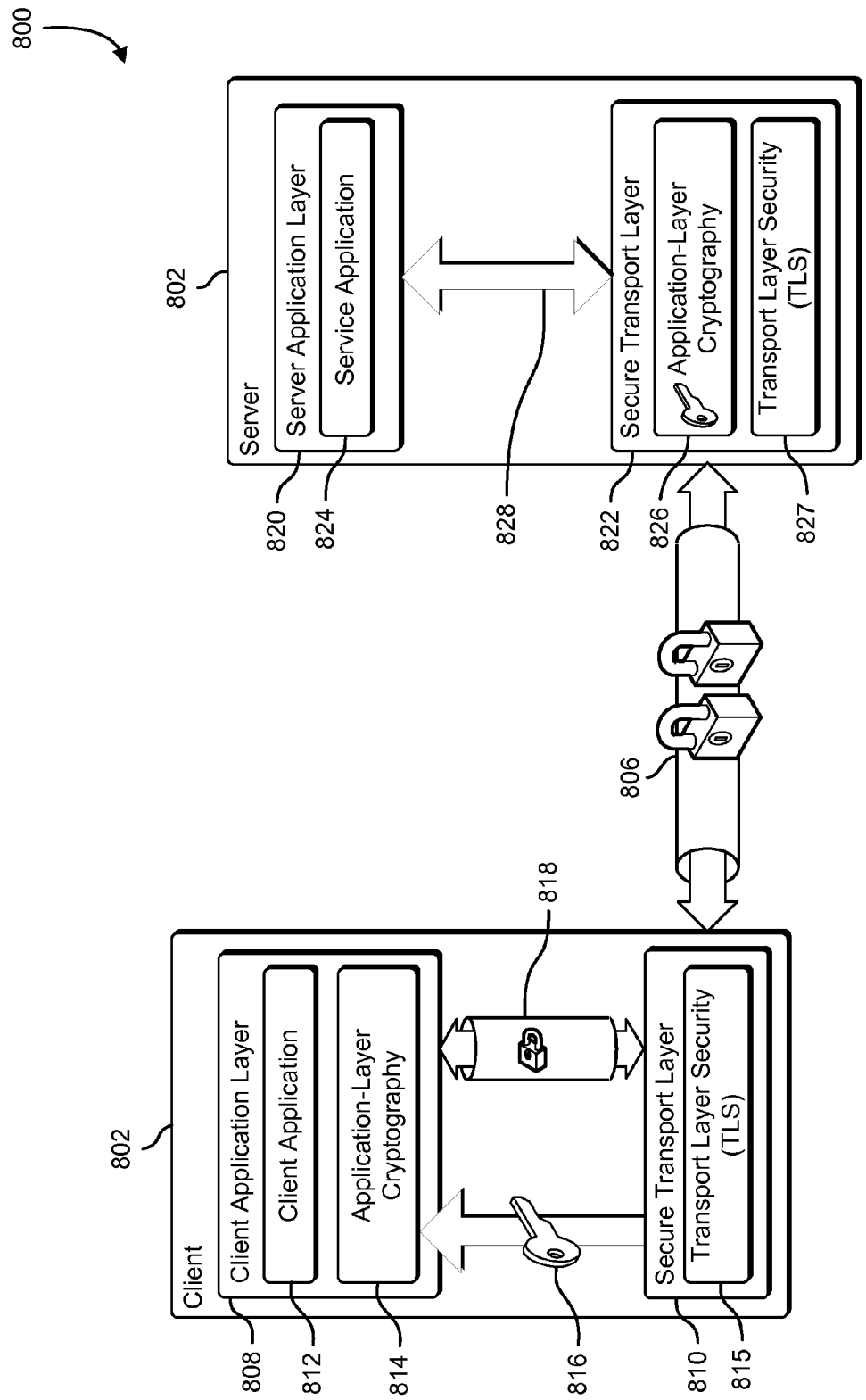
FIG. 8 shows an illustrative example of a system that processes data that has been cryptographically secured at the application layer within a secure transport layer, in accordance with an embodiment.

FIG. 8 shows an illustrative example of a system that processes data that has been cryptographically secured at the application layer within a secure transport layer, in accordance with an embodiment. A diagram 800 illustrates a system that includes a client computer system 802 and a server computer system 804. The client computer system 802 and the server computer system 804 communicate over a secure transport connection 806 such as a TLS connection, an SSL connection, a Virtual Private Network ("VPN") connection, or an IPsec connection. The client computer system 802 includes a client application layer 808 and a secure transport layer 810. The client application layer 808 includes application programs and services that run within the application space of the client computer system 802. A client application 812 provides various user interface, business logic, and connectivity functions to access a corresponding service application that runs on the server computer system 804. In some embodiments, the client application 812 is a JavaScript application running within a web browser. An application-layer cryptography component 814 provides cryptographic functions to the client application 812. The cryptographic functions may include encryption, decryption, digital signing, and signature verification functions. The secure transport layer 810 provides transport-level network connectivity to applications and services in the client application layer 808. The secure transport layer 810 may include one or more transport protocol components that implement secure transport-level protocols such as TLS, SSL, IPSec, or other secure transport protocols. In the implementation shown in FIG. 1, the secure transport layer 810 includes a transport layer security component 815 that implements a version of the TLS protocol. The transport layer security component 815 may implement TLS version 1.0, 1.1, 1.2, 1.3, SSL V3.0, or other secure transport protocol that negotiates shared-secret cryptographic material as part of establishing a connection between the client computer system 802 and the server computer system 804. An application-layer cryptographic key 816 is derived from the shared-secret cryptographic material produced by the transport layer security component 815, and provided from the secure transport layer 810 to the application-layer cryptography component 814. The application-layer cryptography component 814 exchanges encrypted application data with the secure transport layer 1810 over an application-layer encrypted channel 818. The application-layer encrypted channel 818 can be a system call, a call to a system service, a system message, or an API call.

The server computer system 804 includes a service application layer 820 and a secure transport layer 822. The service application layer 820 includes a service application 824. The service application 824 implements functions associated with a service provided to the client application 812. In some embodiments, the service application can be a web server. The secure transport layer 122 includes an application-layer cryptography component 826 and a transport layer security component 827. The application-layer cryptography component 826 performs cryptographic functions so that cryptographically protected application data exchanged with the client computer system 802 is converted to plaintext form when provided to the service application 824. The transport layer security component 827 implements a secure transport protocol corresponding to the secure transport protocol implemented by the transport layer security component 815. An application-layer cryptographic key 828 that matches the application-layer cryptographic key 816 is provided by the secure transport layer 822 to the application-layer cryptography component 826. Application data is exchanged between the application-layer cryptography component and the service application 824 in plaintext format.

Figure 9:
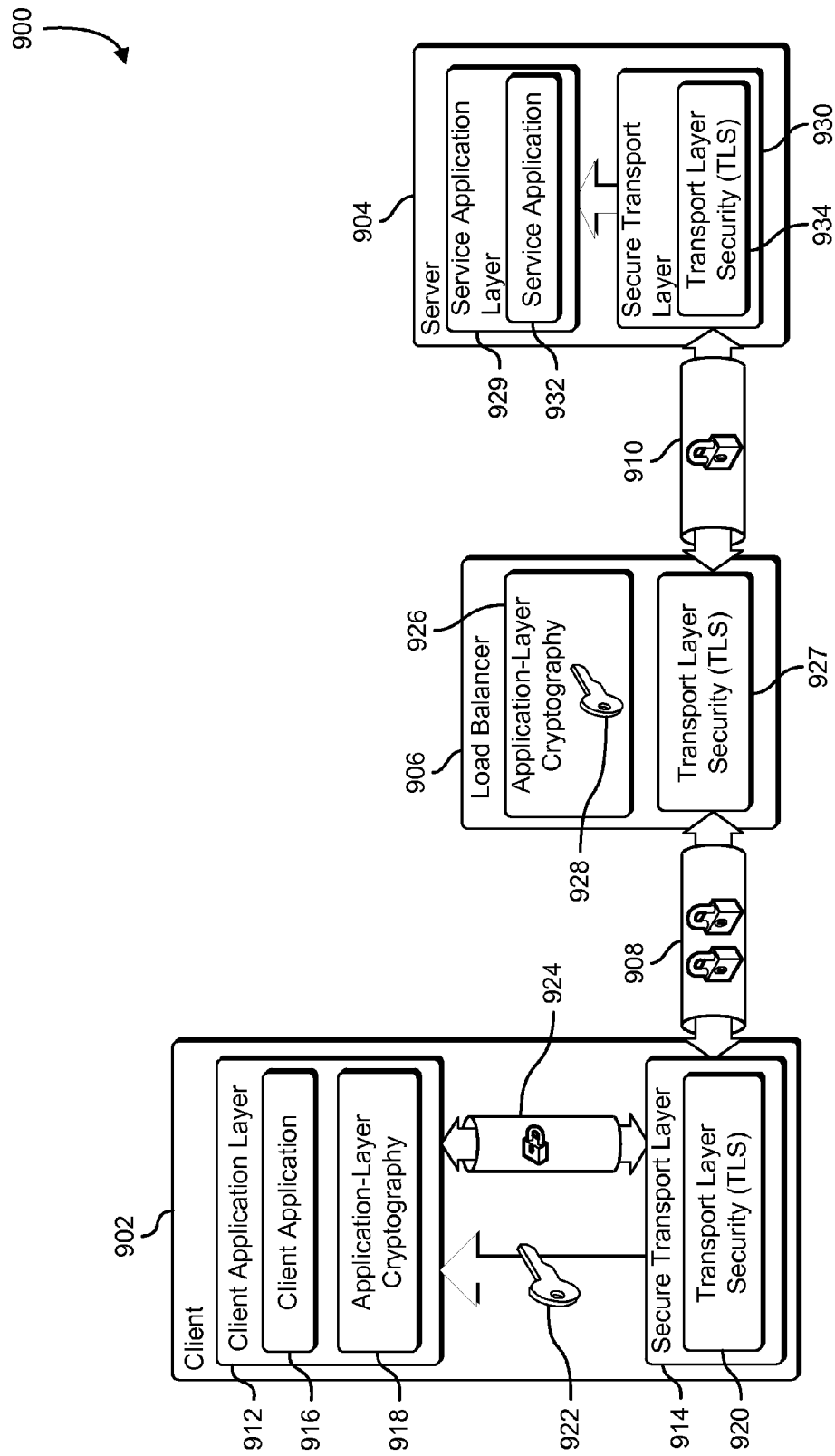
FIG. 9 shows an illustrative example of a system that decrypts application-layer-encrypted data using a load balancer, in accordance with an embodiment.

FIG. 9 shows an illustrative example of a system that decrypts application-layer-encrypted data using a load balancer, in accordance with an embodiment. A diagram 900 illustrates a system that includes a client computer system 902 and a server computer system 904 serviced by a load balancer 906. The client computer system 902 communicates with a load balancer 906 via a first secure transport connection 908. The load balancer 906 communicates with the server computer system 904 via a second secure transport connection 910. The first secure transport connection 908 and the second secure transport connection 910 can be implemented using a version of TLS, SSL, IPSec, or other secure transport protocol which, as part of establishing a logical connection, negotiates shared secret information between the endpoints of the secure connection.

The client computer system 902 includes a client application layer 912 and a secure transport layer 914. The client application layer 912 includes a client application 916 and an application-layer cryptography component 918. The secure transport layer includes a transport layer security component 920. An application-layer cryptographic key 922 is derived from the shared secret information provided by the transport layer security component 920, and associated with the first secure transport connection 908. The application-layer cryptography component 918 uses the application-layer cryptographic key to cryptographically secure application data before providing the application data to the secure transport layer 914. By encrypting application data at the application level, a secure channel 924 is provided between the client application layer 912 and the secure transport layer 914.

The load balancer 906 includes an application-layer cryptography component 926 and a transport layer security component 927. The application-layer cryptography component 926 derives an application-layer cryptographic key 928 that matches the application-layer cryptographic key 922 on the client computer system 902. Application data from the client application layer 912 that is encrypted by the application-layer cryptography component 918 and transmitted over the first secure transport connection 908 is received at the application-layer cryptography component 926 and decrypted using the application-layer cryptographic key 928 before being forwarded to the server computer system 904.

The server computer system 904 includes a service application layer 929 and a secure transport layer 930. The service application layer 929 includes a service application 932. The service application 932 may implement a web service such as a Web server, online storage service, or other online service. The secure transport layer 930 includes a transport layer security component 934. Data exchanged between the load balancer 906 and the server computer system 904 is not encrypted at the application level. The load balancer 906 decrypts the data that was cryptographically secured by the application-layer cryptography component 918, and forwards the plaintext data to the server computer system 904. Application data generated by the service application 932 and transmitted to the client application 916 may be encrypted by the application-layer cryptography component 926. In some implementations, the service application 932 identifies the application data to be encrypted by embedding tags in the outgoing data stream between the server computer system 904 and a load balancer 906. In another implementation, the load balancer 906 includes a set of parsing rules that identify sensitive application data received from the service application 932, and encrypt the identified sensitive application data before transmitting it to the client computer system 902.

Figure 10:
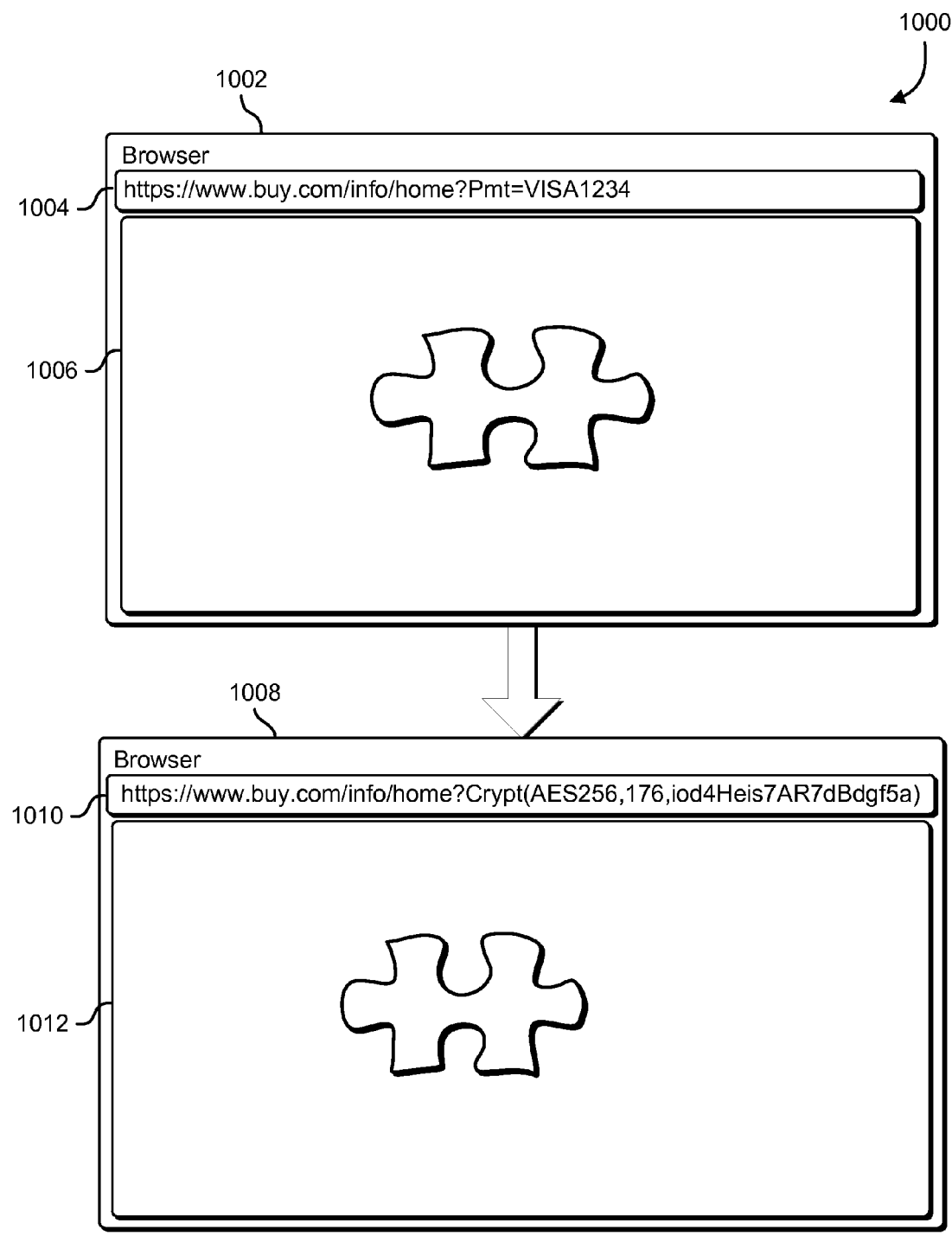
FIG. 10 shows an illustrative example of a web application using application-layer-encrypted GET parameters, in accordance with an embodiment.

FIG. 10 shows an illustrative example of a web application using application-layer-encrypted GET parameters, in accordance with an embodiment. A first browser window 1002 includes a first URL bar 1004 and a first display area 1006. The first URL bar contains sensitive application data in plaintext form. In various environments, a URL may contain sensitive information within an HTTP GET parameter or within the path of the URL itself.

A second browser window 1008 illustrates how, in various embodiments, application-level cryptographic protection improves security of the web application. The second browser window 1008 includes a second URL bar 1010 and a second display area 1012. The second URL bar 1010 illustrates the sensitive application data in a cryptographically protected form. A cryptographically protected parameter in the URL includes an identifier "crypt," to signify that the parameter is in encrypted form. Three comma separated fields identify a cryptographic algorithm used to protect the cryptographically protected parameter, a data length of the encrypted data, and the encrypted data encoded in an alphanumeric format. The cryptographically protected sensitive information is secured from other web applications and the browser itself and, in various implementations, may only be revealed to a corresponding web service application.

Application data that is encrypted at the application level can be distinguished from non-encrypted application data in a number of ways. In some implementations, encrypted application data is transmitted in a fixed format. The encrypted application data includes header information that identifies a cryptographic algorithm used and a length field that indicates the size of the encrypted data. In another implementation, encrypted application data surrounded by identifying tags. The identifying tags include tags for identifying a cryptographic algorithm used to protect the application data, tags for identifying the link to the encrypted data, and tags for identifying the encrypted data itself. In yet another implementation, the receiving application detects that the received data is encrypted by analyzing the characteristics of the received data. Methods to determine whether data is encrypted are described in U.S. patent application Ser. No. 14/741,384, which is incorporated herein by reference.

Figure 11:
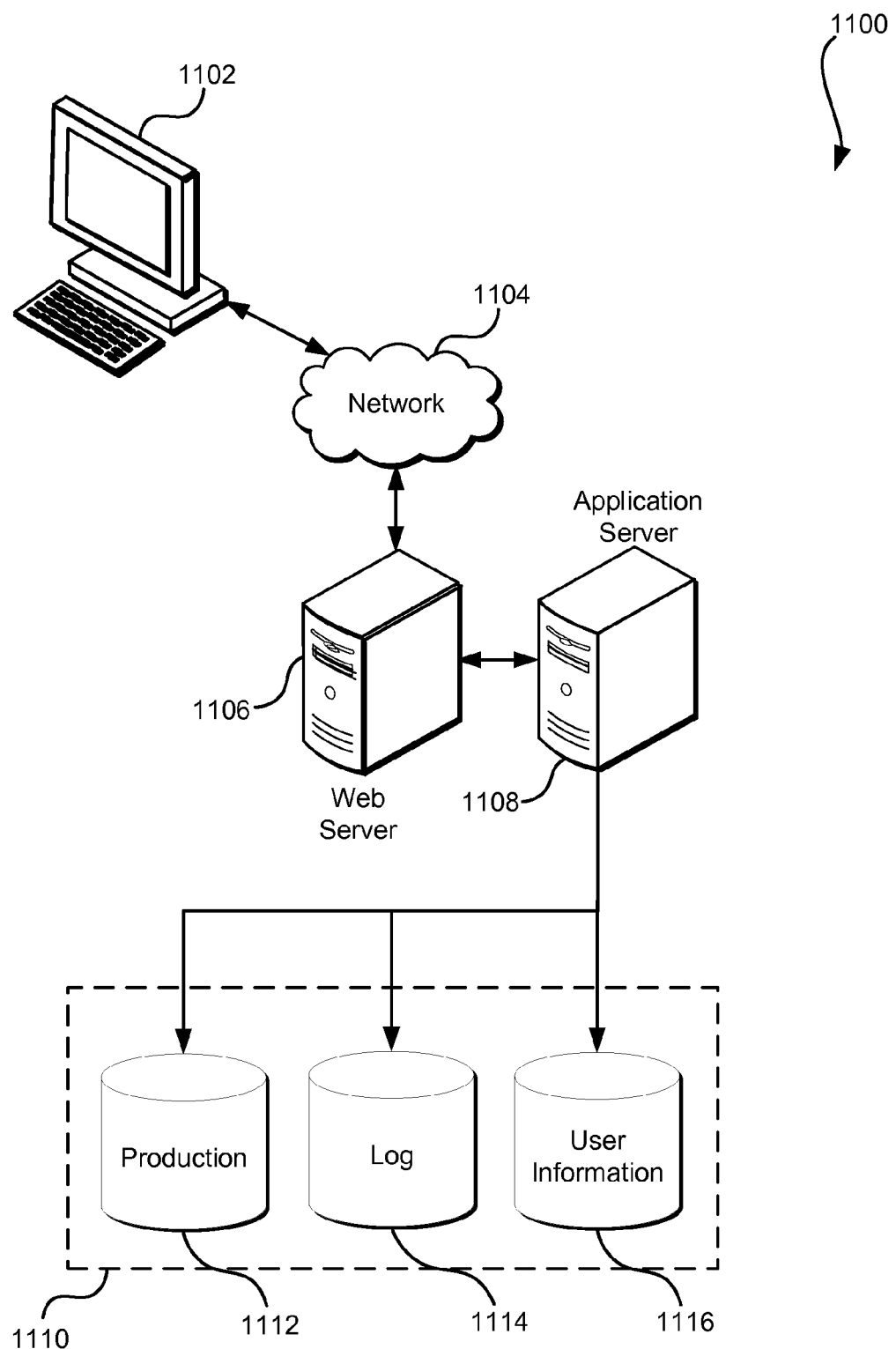
FIG. 11 illustrates an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and/or receive requests, messages, or information over an appropriate network 1104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1102 and the application server 1108, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1110 can include several separate data tables, databases, data documents, dynamic data storage schemes and/or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. The application server 1108 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the client device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UPnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

In the present document, the term "layer" is used to describe a group of applications, services, application program interfaces, components, and code modules that operate in a common context or operate with a common purpose. The term "application layer" refers to a group of programs and services that operate at a high level within a larger system. In general, application layer programs are supplied and managed by the end-users of a computer system. The term "transport layer" refers to a particular category of programs and services that provide functions relating to the creation management and operation of logical connections between network endpoints. In the present document, a "layer" may be referred to as an actor, in which case the action referred to may be performed by any member of the layer or by a plurality of members acting in coordination.

Note that the term "digital signature" includes any information usable to cryptographically verify authenticity of a message including information generated using an RSA-based digital scheme (such as RSA-PSS), the digital signature algorithm (DSA) and the elliptic curve digital signature algorithm, the ElGamal signature scheme, the Schnorr signature scheme, the Pointcheval-Stern signature algorithm, the Rabin signature algorithm, pairing-based digital signature schemes (such as the Boneh-Lynn-Schacham signature scheme), undeniable digital signature schemes, and others. Further, message authentication codes (such as hash-based message authentication codes (HMACs), keyed cryptographic hash functions, and other types of information may also be used as digital signatures.

In various embodiments, data objects such as digital signatures may be cryptographically verifiable. In one example, cryptographically verifiable data objects are created to be cryptographically verifiable by the system to which the data object is to be provided or another system that operates in conjunction with the system to which the data object is to be provided. For example, the data object may be encrypted so as to be decryptable by the system that will cryptographically verify the data object, where the ability to decrypt the data object serves as cryptographic verification of the data object. As another example, the data object may be digitally signed (thereby producing a digital signature of the data object) such that the digital signature is verifiable by the system that will cryptographically verify the data object. In other examples, both encryption and digital signatures are used for cryptographic verifiability and/or security. The key used to encrypt and/or digitally sign the data object may vary in accordance with various embodiments and the same key is not necessarily used for both encryption and digital signing, where applicable. In some embodiments, a key used to encrypt the data object is a public key of a public/private key pair where the private key of the key pair is maintained securely by the system to which the data object is to be provided, thereby enabling the system to decrypt the data object using the private key of the key pair. Using the public key to encrypt the data object may include generating a symmetric key, using the symmetric key to encrypt the data object, and encrypting the symmetric key using the public key, where the encrypted symmetric key is provided to a system with the encrypted data object to enable the system to use the corresponding private key to decrypt the symmetric key and use the decrypted symmetric key to decrypt the data object. Further, in some embodiments, the data object is digitally signed using a private key of a public/private key pair corresponding to the computer system that encrypts and/or digitally signs the data object (e.g., a user device). For example, an application may be provisioned with the private key and the data object may include a certificate for the private key for use by a system for verification of the digital signature of the data object. Other variations, including variations where a symmetric key shared between the user computer and the system that cryptographically verifies the data object can be used to encrypt and/or digitally sign the data object.

Note also that the examples used herein may be performed in compliance with one or more of: Request for Comments (RFC) 4250, RFC 4251, RFC 4252, RFC 4253, RFC 4254, RFC 4255, RFC 4256, RFC 4335, RFC 4344, RFC 4345, RFC 4419, RFC 4432, RFC 4462, RFC 4716, RFC 4819, RFC 5647, RFC 5656, RFC 6187, RFC 6239, RFC 6594, and RFC 6668, which are incorporated by reference.

Generally, embodiments of the present disclosure may use various protocols, such as a SSL or TLS protocol and extensions thereto, such as defined in Request for Comments (RFC) 2246, RFC 2595, RFC 2712, RFC 2817, RFC 2818, RFC 3207, RFC 3268, RFC 3546, RFC 3749, RFC 3943, RFC 4132, RFC 4162, RFC 4217, RFC 4279, RFC 4347, RFC 4366, RFC 4492, RFC 4680, RFC 4681, RFC 4785, RFC 5054, RFC 5077, RFC 5081, RFC 5238, RFC 5246, RFC 5288, RFC 5289, RFC 5746, RFC 5764, RFC 5878, RFC 5932, RFC 6083, RFC 6066, RFC 6091, RFC 6176, RFC 6209, RFC 6347, RFC 6367, RFC 6460, RFC 6655, RFC 7027, and RFC 7366 which are incorporated herein by reference, to establish encrypted communications sessions. Other protocols implemented below the application layer of the Open Systems Interconnect (OSI) model may also be used and/or adapted to utilize techniques described herein. It should be noted that the techniques described herein are adaptable to other protocols such as the Real Time Messaging Protocol (RTMP), the Point-to-Point Tunneling Protocol (PPTP), the Layer 2 Tunneling Protocol, various virtual private network (VPN) protocols, Internet Protocol Security (e.g., as defined in RFC 1825 through 1829, RFC 2401, RFC 2412, RFC 4301, RFC 4309, and RFC 4303), and other protocols, such as protocols for secure communication that include a handshake.

Note that a system is said to be configured to trust a public cryptographic key if logic with which the system is configured to operate is dependent on whether an attempt to verify a digital signature with the public cryptographic key is successful. Similarly, a system is said to be configured to trust a symmetric cryptographic key if logic with which the system is configured to operate is dependent on whether an attempt to verify a digital signature with the symmetric cryptographic key is successful.

The preceding and following description refers to random numbers, randomly generated numbers, pseudo-randomly generated numbers and pseudorandom numbers. These terms refer to the generation of values that appear to lack a discernible pattern, appear random to a human observer, or satisfy certain statistical tests for randomness. Random numbers may be generated using true or pseudorandom methods. True random number methods may rely on an entropy source such as atmospheric noise, thermal noise or electromagnetic or other physical phenomena. Pseudorandom methods may be built on linear feedback shift registers or cryptographically secure pseudorandom number generators. In many environments, numbers generated with true random or pseudorandom processes are interchangeable. In the present document, a number generated with any these techniques may be referred to as a random number or a randomly generated number.

In the preceding and following description, various techniques are described. For purposes of explanation, specific configurations and details are set forth in order to provide a thorough understanding of possible ways of implementing the techniques. However, it will also be apparent that the techniques described in this document may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method comprising:
    establishing a communication channel from a client application to a service application using a cryptographically-protected transport layer, the cryptographically-protected transport layer negotiating a shared secret as a result of establishing the communication channel;
    deriving a session key based at least in part on the shared secret;
    deriving an application-layer cryptographic key based at least in part on the shared secret;
    providing the application-layer cryptographic key to the client application;
    generating encrypted application data at least in part by encrypting, within an application layer, application data using the application-layer cryptographic key;
    encrypting the encrypted application data with the session key to produce re-encrypted application data; and
    sending the re-encrypted application data to the service application over the communication channel.

2. The computer-implemented method of claim 1, further comprising:
    receiving an encrypted reply via the communication channel; and
    acquiring a plaintext reply by decrypting the encrypted reply with the application-layer cryptographic key.

3. The computer-implemented method of claim 1, wherein the application-layer cryptographic key is derived from the shared secret using a key derivation function.

4. The computer-implemented method of claim 1, wherein the shared secret is a pre-master secret, a master secret, or a session key negotiated as a result of establishing a TLS session.

5. A system, comprising:
    one or more processors; and
    memory storing instructions that, if executed by the one or more processors, cause the system to implement a service that:

establishes a connection to a client application in accordance with a cryptographically-protected communication protocol, the cryptographically-protected communication protocol generating a session key and a shared secret, the shared secret accessible to the client application and the service;
derives an application-layer key based at least in part on the shared secret;
encrypts data with the application-layer key to produce encrypted data; and
sends the encrypted data to the client application via the connection, causing the encrypted data to be encrypted with the session key in accordance with the cryptographically-protected communication protocol.

6. The system of claim 5, wherein:
the connection is a TLS session;
the cryptographically-protected communication protocol is a version of the TLS protocol; and
the application-layer key matches a TLS session key associated with the TLS session.

7. The system of claim 5, wherein the service is further configured to:
identify a pre-shared secret that is associated with the service;
derive an additional application-layer key based at least in part on the shared secret and the pre-shared secret; and
provide the additional application-layer key to the service.

8. The system of claim 5, wherein the service is further configured to:
identify sensitive application data;
generate encrypted sensitive application data by encrypting the sensitive application data with the application-layer key; and
transmit the encrypted sensitive application data to the client application via the connection.

9. The system of claim 5, wherein the service is further configured to:
receive, from the client application, encrypted application data via the connection; and
decrypt the encrypted application data with the application-layer key.

10. The system of claim 5, wherein the service is further configured to:
store a copy of the application-layer key;
close the connection to the client application; and
perform cryptographic operations using the copy of the application-layer key.

11. The system of claim 5, wherein the service is further configured to:
receive encrypted application data from the client application via the connection, the encrypted application data encrypted with a public cryptographic key associated with the service; and
decrypt the encrypted application data using a private key associated with the public cryptographic key.

12. The system of claim 5, wherein:
the service is a load balancing service; and
the data is associated with a second service hosted by a second computing device.

13. A non-transitory computer-readable storage medium having stored thereon executable instructions that, as a result of being executed by one or more processors of a computer system, cause the computer system to at least:
establish a network connection between a first application and a second application, the network connection being in accordance with a cryptographically-protected communication protocol, the network connection having an associated session key and a shared secret;
determine a cryptographic key based at least in part on the shared secret;
generate cryptographically protected data by encrypting application data using the cryptographic key; and
cause the cryptographically protected data to be encrypted with the associated session key and exchanged between the first application and the second application via the network connection.

14. The non-transitory computer-readable storage medium of claim 13, wherein:
the cryptographically-protected communication protocol is a version of the TLS protocol; and
the shared secret is a session key, premaster secret, or master secret associated with the network connection.

15. The non-transitory computer-readable storage medium of claim 13, wherein the cryptographic key is derived at least in part by applying a one-way function to the shared secret.

16. The non-transitory computer-readable storage medium of claim 13, wherein the instructions further include instructions that cause the computer system to cryptographically protected the application data by applying a digital signature to the application data, the digital signature based at least in part on the cryptographic key.

17. The non-transitory computer-readable storage medium of claim 13, wherein the instructions further comprise instructions that, as a result of being executed by the one or more processors, cause the computer system to:
identify a characteristic of the shared secret; and
select a cryptographic algorithm to generate the cryptographically protected data based at least in part on the characteristic of the shared secret.

18. The non-transitory computer-readable storage medium of claim 13, wherein the instructions further comprise instructions that, as a result of being executed by the one or more processors, cause the computer system to:
identify a cryptographic algorithm for generating the cryptographically protected data; and
modify the cryptographic key based at least in part on the cryptographic algorithm.

19. The non-transitory computer-readable storage medium of claim 13, wherein the application data includes a parameter within a Uniform Resource Identifier.

20. The non-transitory computer-readable storage medium of claim 13, wherein:
the first application is a JavaScript application configured to operate in a context of a Web browser; and
the second application is network service application.

* * * * *